United States Patent [19]

Barrett

[11] Patent Number: 4,718,233
[45] Date of Patent: Jan. 12, 1988

[54] SOLAR POWER TAKE OFF

[76] Inventor: Wilford C. Barrett, 6109 New Sapulpa Rd., Tulsa, Okla. 74103

[21] Appl. No.: 780,572

[22] Filed: Sep. 26, 1985

[51] Int. Cl.$^4$ ............................................. F03B 17/02
[52] U.S. Cl. ...................................... 60/496; 60/698; 290/1 R
[58] Field of Search .................. 60/495, 496, 641.8, 60/652, 698, 716; 136/206; 290/1 R, 5

[56] References Cited

U.S. PATENT DOCUMENTS

| | | | |
|---|---|---|---|
| 4,054,031 | 10/1977 | Johnson | 60/496 |
| 4,326,132 | 4/1982 | Bokel | 290/1 R |
| 4,512,157 | 4/1985 | Weadock | 60/641.8 |

Primary Examiner—Stephen F. Husar
Attorney, Agent, or Firm—Head & Johnson

[57] ABSTRACT

A system for converting DC electrical solar generated energy to AC electrical energy. A DC motor is driven by electricity obtained from DC electrical energy producing solar panels. The DC motor drives an air compressor which in turn provides, via Archimedes' principle, a constant flow of air to a submerged cross-flow turbine. The turbine is rotated by the rising air bubbles through the water. An AC generator is connected to the shaft of the turbine. The output of the AC generator is then fed to the consumers or homeowners electrical supply lines.

9 Claims, 4 Drawing Figures

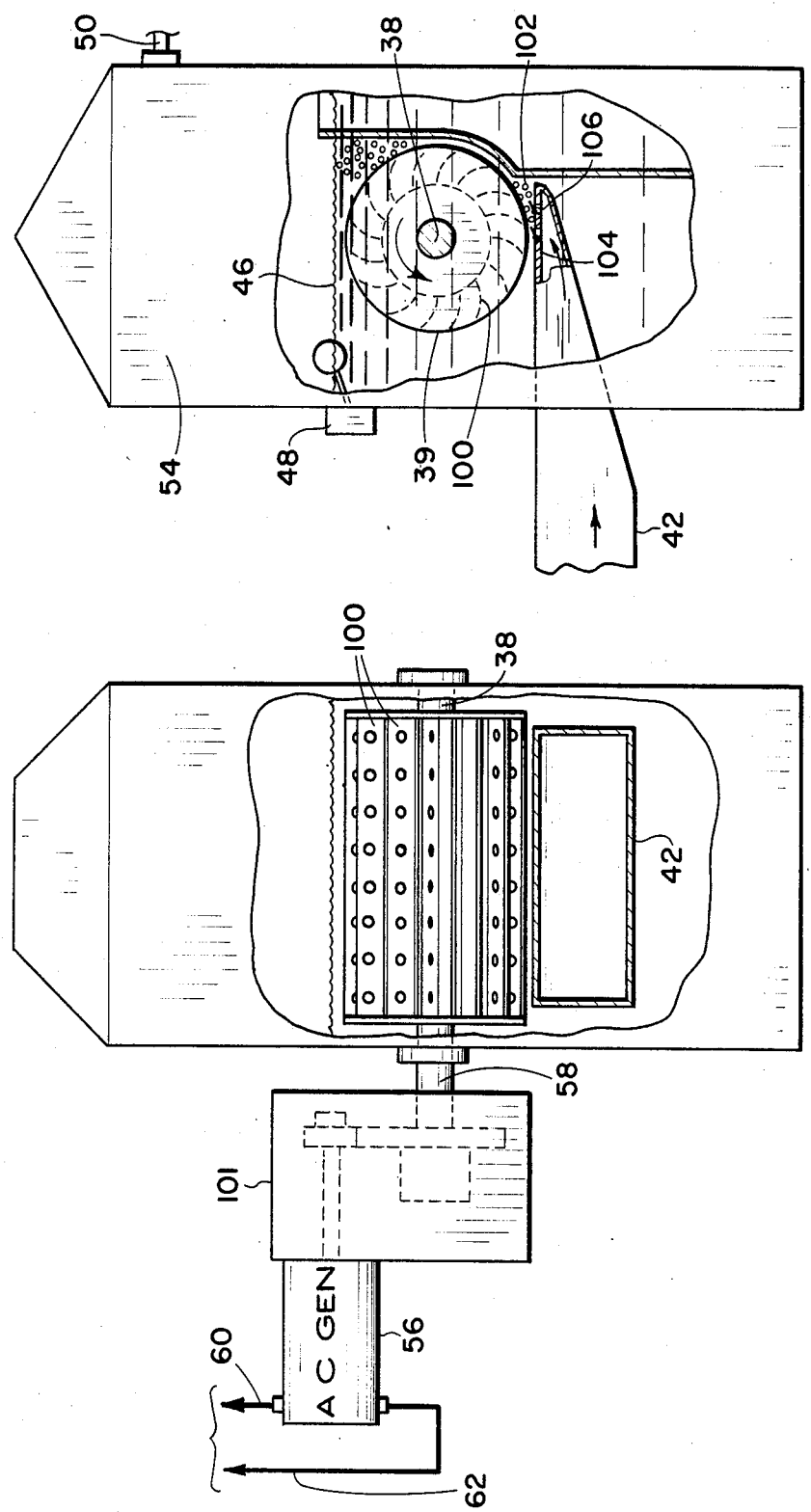

SOLAR POWER TAKE OFF

DISCLOSURE STATEMENT

The following patents were found as a result of a preliminary patentability search on this application:

U.S. Pat. No. 3,383,246
U.S. Pat. No. 3,916,626
U.S. Pat. No. 3,977,909
U.S. Pat. No. 4,028,893
U.S. Pat. No. 4,038,826
U.S. Pat. No. 4,079,591
U.S. Pat. No. 4,095,426
U.S. Pat. No. 4,141,218
U.S. Pat. No. 4,170,114
U.S. Pat. No. 4,196,590
U.S. Pat. No. 4,229,660
U.S. Pat. No. 4,234,354
U.S. Pat. No. 4,246,080
U.S. Pat. No. 4,266,402
U.S. Pat. No. 4,309,148
U.S. Pat. No. 4,409,961
U.S. Pat. No. 389,125
U.S. Pat. No. 527,379

None of these patents show the claimed invention. U.S. Pat. No. 4,038,826 to John S. Shaw entitled "Solar Energy System Utilizing Bouyancy as a Conversion Force" concerns a closed cycle energy conversion system adaptable for use with solar collectors and other sources of available heat for increasing the temperature of a circulating fluid to a super heated condition and employing a substantially vertically positioned gas expander column comprising an endless arrangement of cups journaled for moving in a closed path within a liquid medium. U.S. Pat. No. 4,028,893 to John B. Shaw entitled "Open Cycle Solar Energy System Utilizing Bouyancy as a Conversion Force" is similar to the John S. Shaw patent. There are several patents relating to recirculating submersible turbines such as Robert L. Pruitt's U.S. Pat. Nos. 4,266,402 and 4,170,114 and to Charles M. Johnson's U.S. Pat. No. 4,054,031.

U.S. Pat. No. 4,141,218 entitled "Bouyancy Operated Sunmill" issued to Erick R. Rayboy concerns a sun powered engine to convert the heat of the sun's rays into mechanical energy which can be used to power a generator or other mechanism having a rotating shaft. It uses heat expanded trapped bubbles to provide bouyancy to vanes contained within a sealed drum thereby causing the drum to rotate.

U.S. Pat. No. 3,977,909 entitled "Solar Heat Energy Conversion System" is a system for converting solar heat energy to electrical energy.

BACKGROUND OF THE INVENTION

This invention relates to a system for generating alternating current (AC) electrical energy from direct current (DC) electrical energy produced by a solar panel. In recent years the demand for all forms of energy has literally sky-rocketed. The construction of hydroelectrical facilities, the development of fossil fuel resources and nuclear generators has continued at a rather rapid rate but it becomes increasingly evident for a number of reasons that these efforts are inadequate to keep pace with the demands of the growing population.

One of the concerns of one of these sources is the enviornment concerns. However, there is one source of energy for which there are really no serious environmental concerns which is very abundant and that is solar energy.

In climates where there is an abundance of sunshine throughout the year, there is a growing interest in the harnessing of solar energy. Homeowners and industrial operations are recognizing the potential value of having their own independent power sources which are not subject to interruption. Many homeowners in the southwestern part of the United States are using various type solar devices to tap this source. Some are merely devices which are thermal in nature and merely rely upon the heat from the sun to heat water or heat the home or do other tasks. There is a growing industry which develops solar panels which generates DC electrical energy direct. However, the DC energy needs to be convered to AC energy for most home uses. This present invention describes a novel and efficient way of making this conversion.

SUMMARY OF THE INVENTION

This invention uses a solar panel which generates directly DC electrical energy. This DC electrical energy has to be converted to AC electrical energy by my novel system which utilizes a submerged cross-flow turbine which is filled with water to above the turbine blades. Air is injected through flutter valves at the bottom of the cross-flow turbine and rises rapidly through the water and drives the turbine. The air is obtained by an air compressor which is driven by a DC electrical motor which gets its energy from the solar panels themselves.

The rotation of the turbine is used to drive an AC electrical generator to generate electricity for use and especially home use.

Switches are provided in the outlet conduits from the AC generator to the house wiring system so that when power goes off from the AC generator, switches automatically connect the house wiring system to an electrical service utility company.

BRIEF DESCRIPTION OF THE DRAWINGS

FIG. 2 shows detail of my cross-flow turbine connected to an AC generator.

FIG. 3 is a side view of my cross-flow turbine showing air rising through the water to drive the turbine wheel.

DETAILED DESCRIPTION OF THE PREFERRED EMBODIMENT

Figure 1:
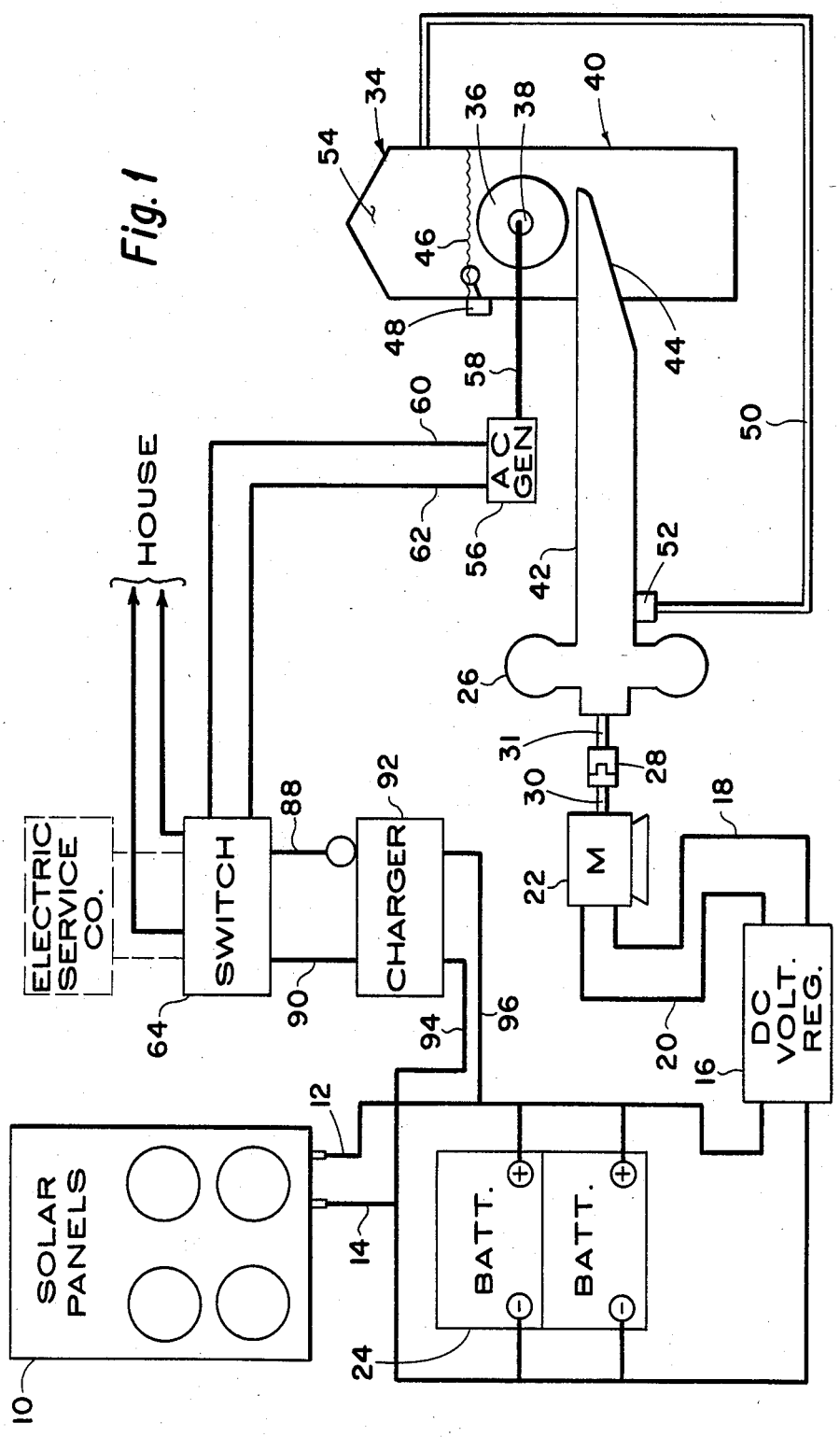
FIG. 1 shows a layout of my DC-AC converter.

FIG. 1 shows the layout of my system by which solar power is effectively used to power a continuous flow air compressor which, in turn, via Archimedes' principal provides a constant flow of air to the submerged cross-flow turbine which in turn powers a suitable AC electrical generator. More particularly shown in FIG. 1 is a solar panel 10 which may be mounted on a roof top for example. This solar panel is any of the recently developed panels which converts solar energy directly to DC energy. As is well known, most homes have appliances which are engineered and constructed for use of AC electrical energy. Therefore, there needs to be a way of converting this DC electrical energy to AC electrical energy.

The outlet from solar panel 10 is connected through electrical conduits 12 and 14 to a DC voltage regulator 16. The output of DC electrical voltage regulator 16 is connected through electrical conduits 18 and 20 to a DC electrical motor 22. I provide a battery pack 24 which is connected to conduits 12 and 14. The batteries allow the system to function for a limited time depending on the AC power drain in the absence of light for energizing the solar panels 10. The voltage regulator 16 is provided to prevent overpowering of the DC electrical motor 22. In order for my cross-flow turbine 34, which I will describe subsequently, to function properly, it must have a constant supply of air under pressure. To obtain this, I provide air compressor 26 which has shaft 31 connected by coupling 28 to the output shaft 30 of DC motor 22.

The output from the air compressor 26 is used to provide the air for driving cross-flow turbine 34 which has a turbine wheel 36 with shaft 38 mounted in a water filled tank or housing 40. The outlet of the air compressor 26 is fed through a delivery pipe or conduit 42 to an injection manifold 44 which injects the air in the proper position under the turbine wheel 36. Details of this will be shown in connection with the FIGS. 2 and 3. The tank is filled with water to a water level 46 which is above the turbine wheel 36 and fill and level control means 48 are provided to maintain the level in the tank. A spray return line 50 is provided from the upper part of tank 40 to inlet 52, which may act as a jet pump, in delivery pipe 42. This is to return water spray from the top portion 54 of housing 40 to the system.

Figure 4:
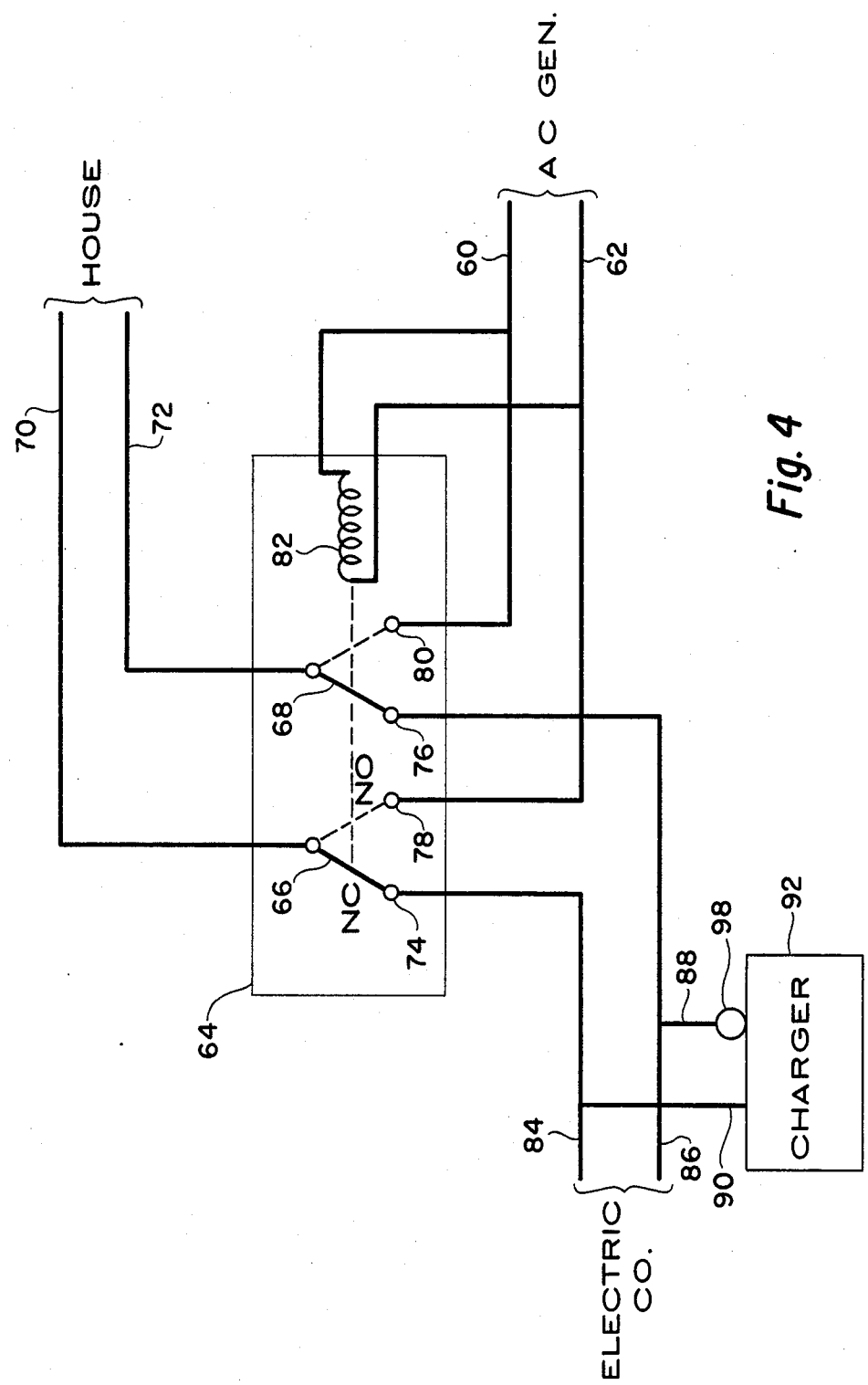
FIG. 4 shows a general wiring diagram of my switches for automatically switching the house wiring system between the AC generator and the supply lines from an electrical utility company.

The rotation of turbine wheel 36 is used to generate AC electricity. This is accomplished by mechanically connecting the shaft of an electrical AC generator 56 by mechanical connector 58 to the shaft 38 of the turbine wheel 36. The output of AC generator 56 is preferably 240 volts 60 cycle to be useful with most home appliances. The voltage can be transformed as needed. The output of the AC generator 56 is connected through conduits 60 and 62 to a switch 64. Attention is directed to FIG. 4. Shown thereon are two two-way switches 66 and 68. The base terminal of switchs 66 and 68 are connected respectfully to conduits 70 and 72 which connects to the house circuit. Switch 66 has separated contacts 74 and 78 and switch 68 has separated contacts 76 and 80. Switches 66 and 68 have the normal position of being on contacts 74 and 76. Conduits 60 and 62 are connected through a switch actuating mechanism 82 which may include a coil with proper relays which drives switches 66 and 68 from one position to a second position. When current is flowing through lines 60 and 62, the switches 66 and 68 would be in contact with switches 78 and 80 which is in the dashed symbol. During this position, the electricity generated by generator 56 is fed to the house circuit. In the event this power fails, then switchs 66 and 68 would go to the position 74 and 76 and would be tied in to an electrical utility company's contacts 84 and 86. The output of switch 64 is connected through conduits 88 and 90 to a charger 92 which has output conduits 94 and 96 which are connected into the battery pack 24. A solar switch 98 is provided to connect the electricity from the electrical service company to charger 92 when solar panels 10 become inoperative such as due to absence of light. Charger 92 can be any type charger which receives AC electrical energy and converts it to the appropriate voltage DC electrical energy for charging the batteries 24. Charger 92 is typically provided with an overcharge cut-off so that batteries 24 will not be overcharged.

Attention is now especially directed to FIGS. 2 and 3. Mounted about shaft 38 is a plurality of turbine vanes 100. As shown in FIG. 3, these vanes are slightly curved so as to catch the air bubbles 102 which pass the injection header manifold 104 is provided with flutter valves 106. These flutter valves prevent excessive backflow leakage. The output shaft 58 is connected to gearbox 101 to drive the AC generator 56.

In operation of the cross-flow turbine 34, air is injected up through flutter valves 106 and is collected on the underside of vanes 100. These vanes provide great power to the turbine from the air which rises through the water in accordance with Archimedes' principles. The air stays trapped beneath a vane until the edge 39 of that vane starts to become the highest part of the vane. This time the bubbles of air escape up through the water and into space 54 and can escape through the upper portion of the housing into the atmosphere.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. An apparatus for generating AC electrical energy from solar energy which comprises:
   solar panel means for generating DC electrical energy;
   a DC motor connected to said solar panel means;
   a housing;
   a cross-flow turbine in said housing having a shaft and with curved vanes attached thereto and which are submerged in water;
   an air compressor driven by said DC motor and having an air outlet;
   connecting means connecting said air outlet to said cross-flow turbine below said vanes;
   an AC generator connected to the shaft of the cross-flow turbine.

2. An apparatus as defined in claim 1 in which said connecting means includes a conduit with a header to transport the air from the air compressor to the cross-flow turbine and in which the header has flutter valves therein positioned beneath the vanes of such cross-flow turbine.

3. An apparatus as defined in claim 2 including a return conduit connecting the top portion of the interior of the housing of the cross-flow compressor above the water level to the outlet of the air turbine.

4. An apparatus as defined in claim 2 including batteries connected to the output of the solar panels.

5. An apparatus as defined in claim 4 including housing wiring circuit and an external AC power source, a switch which connects said housing wiring circuit to the output of said AC generator when there is an output thereon and connecting to the external AC source when there is no output on said AC generator.

6. A method of generating AC electrical energy from a solar panel means capable of generating DC electrical energy which comprises:

driving a DC electrical motor by said DC output from said solar panel;

driving an air compressor by the output mechanical power of said DC motor;

providing a cross-flow turbine in a housing and having a turbine wheel mounted therein with an output shaft;

providing water at a constant level within said housing to above said turbine wheel;

using the air output from said air compressor to inject air bubbles directly under said turbine wheel to cause said wheels to rotate as the air bubbles rise through the water;

using the rotation of said turbine wheel to generate AC electricity and using such generated AC electricity.

7. An apparatus for generating AC electrical energy from solar energy which comprises:

solar panel means for generating DC electrical energy;

a DC motor connected to said solar panel means;

a housing;

a cross-flow turbine in said housing having a shaft and with curved vanes attached thereto and which are submerged in water;

an air compressor driven by said DC motor and having an outlet;

connection means connecting said air outlet to said cross-flow turbine below said vanes, said connecting means including a conduit with a header to transport the air from the air compressor to the cross-flow turbine and in which the header has flutter valves therein positioned beneath the vane of such cross-flow turbine;

an AC generator connected to the shaft of the cross-flow turbine;

a return conduit connecting the top portion of the interior of the housing of the cross-flow turbine above the water level to the outlet of the air compressor;

batteries connected to the output of the solar system;

housing wiring circuit and an external AC power source;

a switch connecting said housing wiring in circuit to the output of said AC generator when there is an output thereon and connecting through the external AC source when there is no output on the said AC generator.

8. An apparatus as defined in claim 7 including means to maintain the level of the water above the vanes of the turbine.

9. An apparatus for generating AC electrical energy from solar energy which comprises:

solar panel means for generating DC electrical energy;

a DC motor connected to said solar panel means;

a housing;

a cross-flow turbine in said housing having a shaft at which curved vanes attach thereto and which are submerged in water;

an air compressor driven by said DC motor and having an air outlet;

connecting means for connecting said air outlet to said cross-flow turbine below said vanes;

an AC generator connected to the shaft of the cross-flow turbine;

housing wiring circuit and an external AC power source;

a switch connecting said housing wiring and circuit to the output of said AC generator when there is an output thereon and connecting to the external AC source when there is no output on said AC generator.

* * * * *